Jan. 8, 1952      E. B. SCHON      2,582,170
DUPLICATING ATTACHMENT FOR CONTOUR SHAPING MACHINES
Filed Dec. 22, 1949      2 SHEETS—SHEET 1
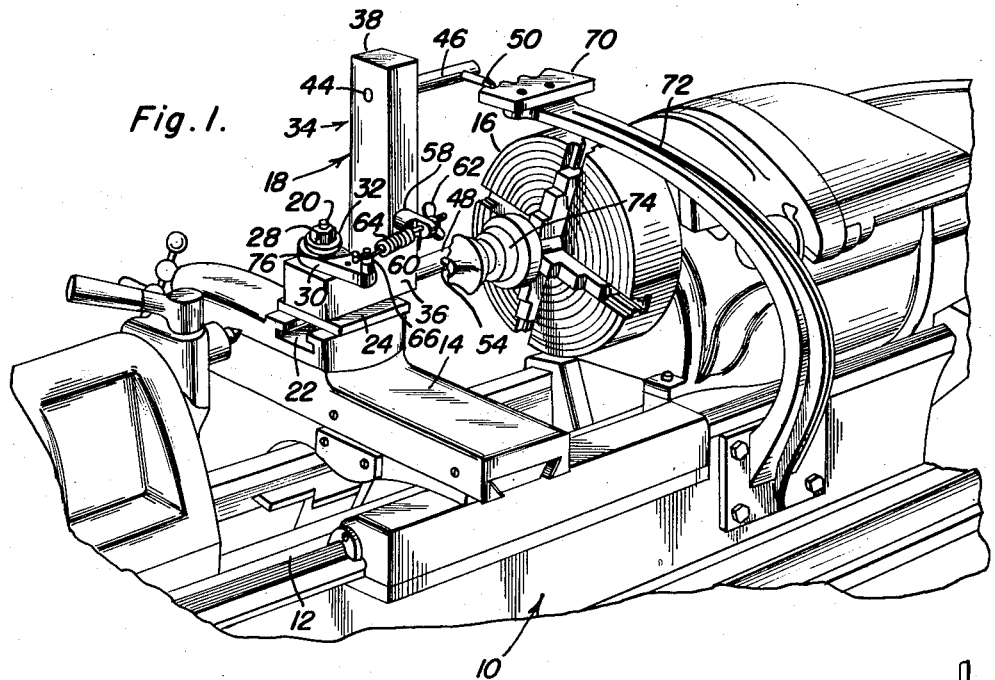
Einar B. Schon
INVENTOR.
BY *[signatures]*
Attorneys

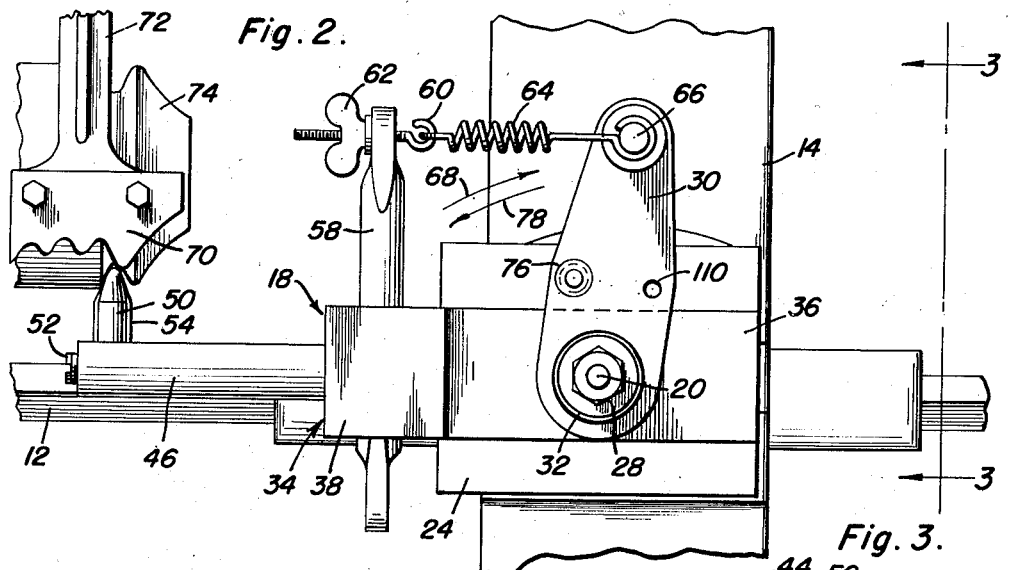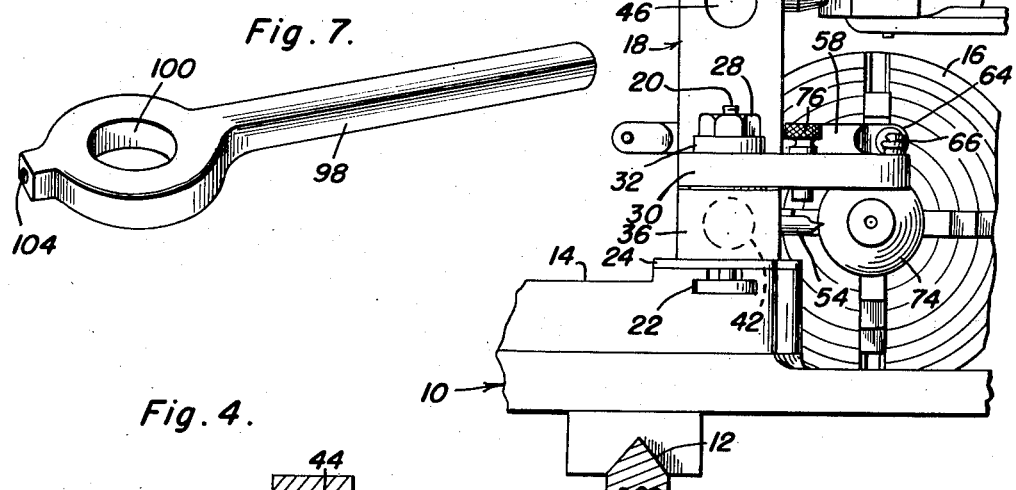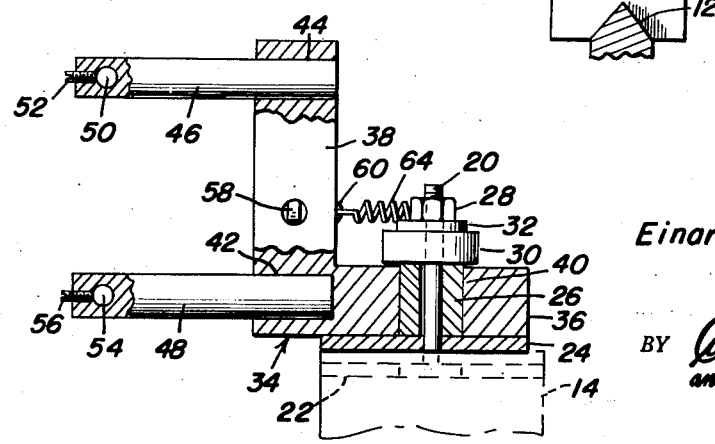

Patented Jan. 8, 1952

2,582,170

UNITED STATES PATENT OFFICE 2,582,170

DUPLICATING ATTACHMENT FOR CONTOUR SHAPING MACHINES

Einar B. Schon, Sun Prairie, Wis.

Application December 22, 1949, Serial No. 134,497

3 Claims. (Cl. 90—13.4)

This invention relates to new and useful improvements and structural refinements in duplicating attachments for contour shaping machines such as lathes, milling machines, etc., and the principal object of the invention is to facilitate expeditious and accurate duplication of several pieces of work in accordance with a given template.

Some of the advantages of the invention reside in its simplicity of construction, in its expeditious and accurate operation as aforesaid, and in its adaptability for use on shaping machines of different types.

With the above more important objects and features in view and such other objects and features as may become apparent as this specification proceeds, the invention consists essentially of the arrangement and construction of parts as illustrated in the accompanying drawings, in which:

Figure 1 is a fragmentary perspective view of a lathe showing the invention in situ thereon.

Figure 2 is a fragmentary top plan view of the subject shown in Figure 1.

Figure 3 is a fragmentary sectional view, taken substantially in the plane of the line 3—3 in Figure 2.

Figure 4 is an elevational view of the invention per se, this being partially broken away so as to reveal its construction.

Figure 5 is a fragmentary front elevational view of a milling machine showing the invention in situ thereon.

Figure 6 is a fragmentary side view of the subject shown in Figure 5, and

Figure 7 is a perspective view of a cutter holding member used in the device shown in Figures 5 and 6.

Like characters of reference are employed to designate like parts in the specification and throughout the several views.

Referring now to the accompanying drawings in detail, more particularly to Figures 1-4 inclusive, the general reference character 10 designates a conventional lathe including a bed 12, a compound 14 and a face plate 16, the invention residing in the provision of a duplicating attachment designated generally by the reference character 18.

The attachment 18 embodies in its construction a vertical fulcrum element 20 which, for example, may assume the form of a T-bolt inserted in a T-slot 22 in the compound 14, the element 20 having positioned thereon a base plate 24 and a bushing 26 so that by tightening a nut 28 with which the T-bolt 20 is provided, the bushing 26 and the base plate 24 may be firmly clamped in position on the compound 14.

It is to be also noted that a laterally projecting tensioning limb 30, the purpose of which will be hereinafter described, is clamped on the element 20 between the bushing 26 and a washer 32 positioned under the nut 28, as is best shown in Figures 1, 3 and 4.

A substantially L-shaped support 34 includes a horizontal arm 36 and a vertical arm 38, the arm 36 being provided with a bore 40 and being of a thickness slightly lesser than the length of the bushing 26, so that the entire support 34 may be rotatably positioned on the bushing and, consequently, on the fulcrum element 20, as is best shown in Figure 4.

The vertical arm 38 of the support 34, on the other hand, is provided with a pair of vertically spaced, horizontal bores 42, 44 to receive a pair of laterally projecting holding members 46, 48 respectively.

A suitable tracing element 50 is removably secured by a set screw 52 in the holding member 46, while a cutting element 54 is similarly secured by a set screw 56 in the holding member 48. The two elements 50, 54 are vertically aligned, substantially as shown.

A bar 58 projects laterally from the vertical arm 38 of the support 34 at right angles to the members 46, 48 and the outer end portion thereof accommodates a screw eye 60, adjustable by means of a wing nut 62. A tension spring 64 is anchored at one end thereof on the screw eye 60, while its remaining end is anchored as at 66 to the aforementioned tensioning limb 30, it being noted that since the limb 30 is stationary, the spring 64 will urge the entire support 34, together with the members 46, 48, to rotate in the direction of the arrow 68 about the fulcrum element 20.

A predetermined template 70 is suitably mounted upon a holder or carrier 72 attached to the bed 12 of the lathe, and the arrangement of the attachment 18 is such that the spring 64 urges the support 34 to rotate about the fulcrum element 20 so as to bring the tracer 50 in engagement with the template 70, while, at the same time, the cutter 54 is brought in engagement with a piece of work 74 held in the face plate or chuck 16. As a result, when the invention is placed in use and the piece of work 74 is rotated by the face plate 16, the cutter 54 will shape the work in accordance with the contour of the template 70, so that accurate and expeditious duplication of several pieces of work will be facilitated.

A suitable stop pin 76 may be provided on the tensioning limb 30 for engagement or abutment by the horizontal arm 36 of the support 34 so as to prevent the support from rotating too far about the element 20 by the action of the spring 64, it being understood, of course, that the position of the stop pin 76 relative to the support 34 is such as to permit the tracer 50 to faithfully follow the contour of the template 70. It is to be also noted that the template may be positioned on the carrier 72 so as to afford shaping of internal as well as external contours, under some such conditions it being desirable to mount the tracer 50 and the cutter 54 on the respective members 46, 48 so that they project to the relatively opposite side thereof while the carrier 34 is urged in the direction of the arrow 78 by the spring 64. This may be achieved by simply projecting the bar 58 to the relatively opposite side of the arm 38, loosening the nut 28 and swinging the limb 30 through approximately 180° on the fulcrum element 20, and thereafter retightening the nut 28 and connecting the spring 64 to the bar 58 and the limb 30.

Referring now to the accompanying Figures 5–7 inclusive, the same illustrate the attachment 18 as being applied to a milling machine designated generally by the reference character 80, the latter including a frame 82 and a table 84 which is vertically adjustable thereon. In addition, the table 84 includes a horizontally adjustable upper portion 86 carrying a pair of compounds 88 which are rotatable simultaneously through the medium of a sprocket chain drive 90 actuated by a hand crank 92, one of the compounds 88 carrying a template 94 while the other compound carries a piece of work 96.

The attachment 18, in this instance, which for one small exception, is identical to the attachment provided on the lathe 10, the exception being that the aforementioned holding member 48, in this instance, is substituted by a similar member 98 having a relatively large socket 100 (see Figure 7) in which a rotatable, electrically or pneumatically driven cutting unit 102 may be secured by a set screw 104.

In this instance, a tracer 106, positioned in the holding member 46, is engageable with the template 94, while the cutter unit 102 is engageable with the piece of work 96, it being obvious from the foregoing that in this fashion a "three dimensional" duplication is possible, namely, shaping of contours in two directions at right angles to each other in a horizontal plane as facilitated by the adjustability of the table 84, 86, and shaping as to depth of cut as facilitated by the rotatability of the support 18 about a horiozntal axis, under the action of the spring 64. In this use of the invention the fulcrum element of the support 84 is horizontally disposed by mounting the entire attachment on a bracket 108 secured to the frame 82 of the machine 80 above the table 84, 86.

Finally, it is to be observed that the attachment 18, as used on a lathe or on a milling machine, has the limb 30 thereof provided with a plurality of apertures (one of which is shown at 110 in Figure 2) for the selective reception of the stop pin 76 to abut the support 34 regardless of the manner in which the limb 30 and the bar 58 are set in relation to the support, as has been already stated.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. A duplicating attachment for contour shaping machines, comprising a fulcrum element, a substantially L-shaped support having a first arm rotatable on said element and a second arm provided with a pair of spaced parallel bores, a pair of holding members each positioned in one of said bores and projecting laterally from the second arm of said support, a tracer carried by one of said holding members, a cutter carried by the other holding member, a tensioning limb secured to said fulcrum element, a coacting bar provided on the second arm of said support, a tension spring extending from said bar to said limb for urging said tracer and said cutter respectively in engagement with a template and a piece of work, said tensioning limb being provided with a stop engageable by the first arm of said support to restrict the extent of rotation of the support on said fulcrum element.

2. In combination with a lathe including a bed and a compound thereon, a duplicating attachment comprising a vertical fulcrum element mounted on said compound, a support rotatable on said fulcrum element, a pair of laterally projecting holding members provided on said support, a tensioning limb secured to said fulcrum element, a work engaging cutter carried by one of said holding members, a tracer carried by the other holding member, a stationary template carrier mounted on said bed, and resilient means operatively connected to said support and to said limb for urging said cutter in engagement with a piece of work and simultaneously urging said tracer in engagement with a template on said carrier.

3. In combination with a milling machine including a frame and a vertically adjustable table thereon, a duplicating attachment comprising a horizontal fulcrum element mounted on said frame above said table, a support rotatable on said fulcrum element, a pair of laterally projecting holding members provided on said support, a tensioning limb secured to said fulcrum element, a rotatable work engaging cutter carried by and extending downwardly from one of said holding members, a downwardly extending tracer carried by the other holding member, and resilient means operatively connected to said support and to said limb for urging said cutter and said tracer respectively in engagement with a piece of work and a template positioned on said table.

EINAR B. SCHON.

REFERENCES CITED

The following references are of record in the file of this patent:

UNITED STATES PATENTS

| Number | Name | Date |
|---|---|---|
| 38,823 | Hayden | June 9, 1863 |
| 2,502,268 | Moss | Mar. 28, 1950 |

FOREIGN PATENTS

| Number | Country | Date |
|---|---|---|
| 19,632 | Switzerland | 1899 |

OTHER REFERENCES

Machinery, issue of Sept. 1944, page 191 (1 pg.).